US008638660B2

(12) United States Patent
Grahn et al.

(10) Patent No.: US 8,638,660 B2
(45) Date of Patent: Jan. 28, 2014

(54) DIRECT TUNNEL ERROR HANDLING

(75) Inventors: Tom Patrik Grahn, Vantaa (FI); Giorgi Gulbani, Espoo (FI); Miikka Martti Einari Huomo, Espoo (FI)

(73) Assignee: Nokia Corporation, Espoo (FI)

( * ) Notice: Subject to any disclaimer, the term of this patent is extended or adjusted under 35 U.S.C. 154(b) by 553 days.

(21) Appl. No.: 12/521,327

(22) PCT Filed: Nov. 30, 2007

(86) PCT No.: PCT/EP2007/063085
§ 371 (c)(1),
(2), (4) Date: Feb. 1, 2010

(87) PCT Pub. No.: WO2008/080717
PCT Pub. Date: Jul. 10, 2008

(65) Prior Publication Data
US 2010/0322068 A1    Dec. 23, 2010

Related U.S. Application Data

(60) Provisional application No. 60/877,621, filed on Dec. 29, 2006, provisional application No. 60/899,016, filed on Feb. 2, 2007.

(51) Int. Cl.
*H04L 12/26* (2006.01)

(52) U.S. Cl.
USPC .......................................................... 370/217

(58) Field of Classification Search
USPC .......................................... 370/217, 325, 328
See application file for complete search history.

(56) References Cited

U.S. PATENT DOCUMENTS 7,440,459 B2 * 10/2008 Casati ........................ 370/395.5
2003/0081607 A1 * 5/2003 Kavanagh ..................... 370/392
2005/0237969 A1 * 10/2005 Jung et al. .................... 370/328

OTHER PUBLICATIONS

"One Tunnel Functional description (Release 7)", Sep. 2006, XP002449389.
Nokia: "Change Request: Direct Tunnel Functionality", Oct. 23, 2006, XP002449388.
"International Search Report and The Written Opinion of the International Searching Authority", received in corresponding PCT Application No. PCT/ep2007/063085, Dated Mar. 19, 2008, 11 pages.
3GPP TS 23.060 V7.3.0 (Dec. 2006), $3^{rd}$ Generation Partnership Project; Technical Specification Group Services and System Aspects; General Packet Radio Service (GPRS); Service Description; Stage 2 (Release 7), (214 pages).

* cited by examiner

*Primary Examiner* — Mark Rinehart
*Assistant Examiner* — Mohammad Anwar
(74) *Attorney, Agent, or Firm* — Harrington & Smith (57) ABSTRACT

An apparatus is disclosed which according to an embodiment is configured to store a direct tunnel context. The direct tunnel context comprises a field or flag indicating whether or not a direct tunnel is established between the apparatus and a radio network, and further comprises at least one of a tunnel endpoint identifier and an address of a user plane of a serving node. The direct tunnel context optionally further comprises at least one of a tunnel endpoint identifier and an address of a user plane of a controller of the radio network. The apparatus may be a gateway or a gateway general packet radio service support node. The invention further provides a method, system, device and program suitable or configured to handle such direct tunnel contexts.

16 Claims, 6 Drawing Sheets

| Other Fields | DT Flag | SGSN IP Address | SGSN TEID-U | RNC IP Address | RNC TEID-U | Other Fields |
|---|---|---|---|---|---|---|

Update PDP Context Request    86

DIRECT TUNNEL ERROR HANDLING

RELATED APPLICATION

This application was originally filed as PCT Application No. PCT/EP2007/063085 filed Nov. 30, 2007, which claims priority to U.S. Provisional Application No. 60/877,621 filed Dec. 29, 2006, and U.S. Provisional Application No. 60/899,016 filed Feb. 2, 2007.

FIELD AND BACKGROUND

Embodiments of the invention generally relate to method, apparatus or device, and system for error handling e.g. in a packet switched network or structure such as general packet radio service, GPRS. Further, embodiments of the invention may generally relate to core networks, CN, and connectivity.

Figure 2:
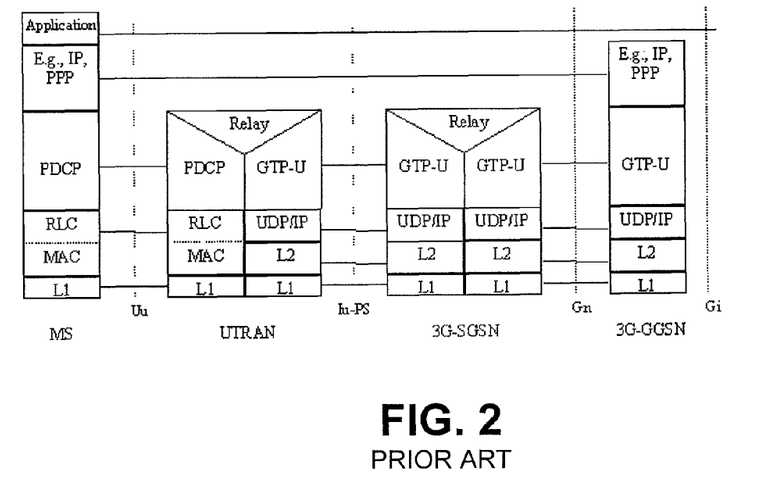
FIG. 2 illustrates protocol stacks and packet flow in a case when no direct tunnel has been established.

A traditional user plane flow is shown in FIG. 2. As illustrated in FIG. 2, a packet data connection between a radio network (e.g. UTRAN/RNC, universal mobile telecommunication system terrestrial radio access network/radio network controller) and a core network usually goes via a serving general packet radio service, GPRS, support node, SGSN.

Figure 3:
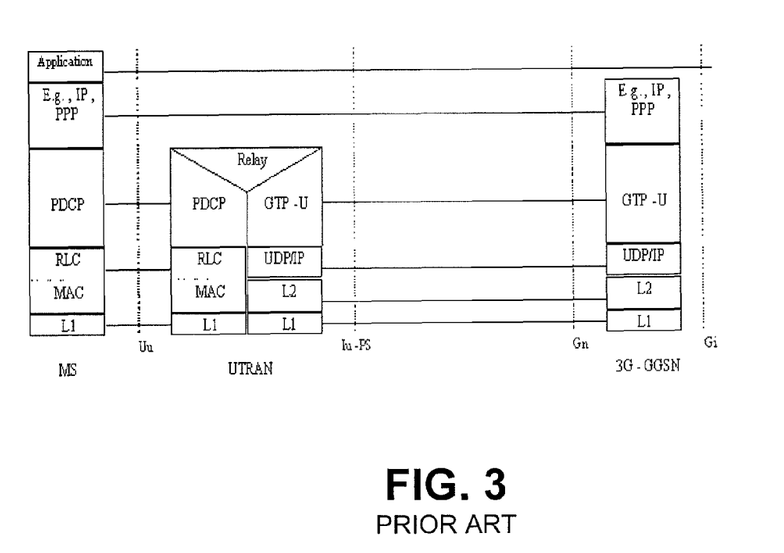
FIG. 3 shows protocol stacks and packet flow in a case when a direct tunnel has been established.

A basic idea in a direct tunnel solution is that the serving node, SGSN, is left out in user plane operation after a packet data connection (e.g. using a packet data protocol, PDP, context) has been set up between the radio network and the packet core network. This direct tunnel functionality is a known functionality which is also called "one tunnel" functionality and is described in specification 3GPP TS 23.060 V7.3.0 (2006-12). A direct tunnel is an optional function e.g. in Iu mode that allows the SGSN to establish a direct user plane tunnel between the radio access network, RAN, and a apparatus GPRS support node, GGSN, within the packet-switched, PS, domain. When a direct tunnel is established (SGSN indicates direct tunnel establishment to GGSN) the GGSN usually sets RNC's address and tunnel endpoint identifier, TEID, as user plane destination for data packets. Thus, when a direct tunnel user plane has been set up as shown in attached FIG. 3, the packet data connection to the radio network (UTRAN/RNC) is established directly between the radio network controller of the radio access network and the gateway GPRS support node, GGSN. In FIG. 3, SGSN is not shown but may be involved in establishing the tunnel in control plane. A direct tunnel capable SGSN has the capability to be configured on a per GGSN and per RNC basis irrespective of whether or not it can use a direct user plane connection. The SGSN handles the control plane signalling and makes the decision when to establish a direct tunnel.

Figure 4:
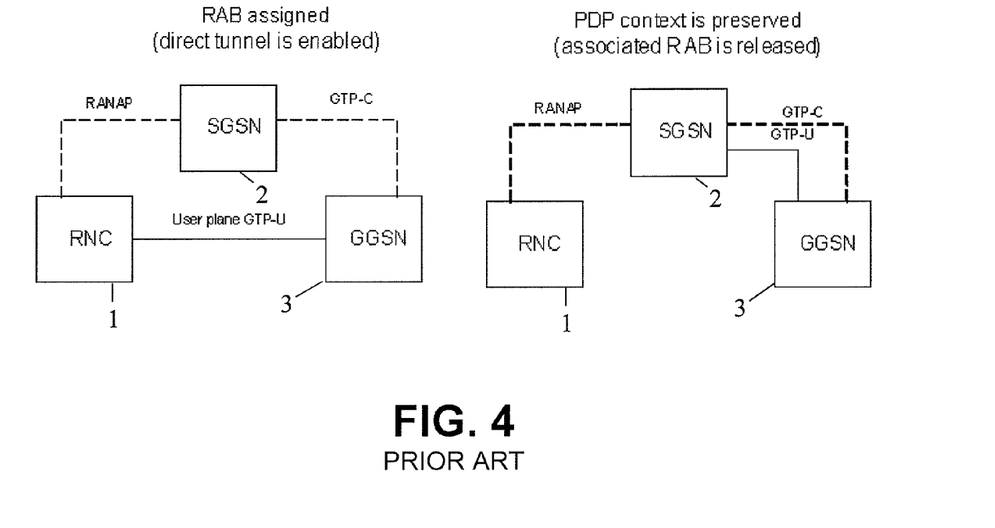
FIG. 4 illustrates packet flows in a case when a direct tunnel has been established; and a subsequent case when an associated RAB has been released.

When a radio access bearer, RAB, assigned for a packet data protocol context is released (i.e. the context is preserved) a tunnel such as a general packet radio service tunnel protocol tunnel for the user plane, GTP-U, tunnel is established between the GGSN and SGSN in order to be able to handle the downlink packets. The letter "U" stands for user plane which serves for transmitting user traffic such as data. The control signaling is handled by the control plane. A bearer release situation is shown in FIG. 4 corresponding to FIG. 15.6-1, idle mode handling, of the standard TS 23.060. There are further conditions in which a direct tunnel should not or no longer be used in following traffic cases such as roaming or a specific subscription or lack of support.

Standards specification TS 23.060 contains a description of user plane protocol stack and definitions which are included hereinto by reference. Section 5.6.2 describes the user plane (Iu mode). Section 5.6.2.1 is directed to the MS, mobile station, -GGSN user plane with GERAN, GSM/EDGE Radio Access Network, in Iu mode. Section 5.6.2.2 illustrates the MS-GGSN user plane with UTRAN. Generally, a packet data convergence protocol (PDCP) is a transmission functionality which maps higher-level characteristics onto the characteristics of the underlying radio-interface protocols. The packet data convergence protocol provides protocol transparency for higher-layer protocols, and supports e.g. internet protocol version 4, IPv4, PPP and internet protocol version 6, IPv6. The packet data convergence protocol provides protocol control information compression.

The GPRS tunnelling protocol, GTP, for the user plane (GTPU) tunnels user data between a radio access network such as a universal mobile telecommunication system terrestrial radio access network, UTRAN, and a third generation, 3G, serving GPRS support node, SGSN, and between GPRS support nodes, GSNs, in the backbone network. The GTP-U, GPRS Tunnelling Protocol-user plane; is a protocol that provides packet transmission and reception services to user plane entities in the gateway GPRS support node (GGSN), the serving GPRS support node (SGSN), and the radio network controller (RNC). The GTP-U is defined for the Gn interface between gateway support nodes (GSN) within a public land mobile network (PLMN), for the Gp interface between GPRS support nodes, GSNs in different public land mobile networks, and for the Iu interface between the serving GPRS support node (SGSN) and the UMTS terrestrial radio access network (UTRAN). UMTS stands for Universal Mobile Telecommunications System. The GTP encapsulates all PDP packet data units, PDUs. An SGSN controls the user plane tunnel establishment and may establish a direct tunnel between UTRAN and GGSN as shown in FIG. 3. User datagram protocol/Internet protocol, UDP/IP, are backbone network protocols used for routeing user data and control signalling. A Radio Link Control, RLC, protocol provides logical link control over the radio interface. There may be several simultaneous RLC links per mobile station, MS. Each link is identified by a bearer identifier, Id. A Medium Access Control (MAC) protocol controls the access signalling (request and grant) procedures for the radio channel. The user plane between GPRS support nodes is the same as for A/Gb mode.

A protocol data unit, PDU, is transferred between different protocol stacks. The actual information to be transmitted end-to-end is carried in PDUs. A tunnel endpoint identifier, TEID, is an identifier that unambiguously identifies a tunnel endpoint in the receiving GPRS tunnelling protocol (GTP) entity. Usually, the receiving end of a GTP tunnel locally assigns the TEID value the transmitting side must use.

Usually, when an RNC/BSC fails, all its RNC/BSC contexts affected by the failure become invalid and should be deleted. When no direct tunnel exists and the RNC/BSC receives a GTPU PDU from an SGSN for which no radio access bearer, RAB, context exists, the RNC/BSC may discard the GTPU PDU and return a GTP error indication to the originating SGSN. The SGSN may locally release the radio access bearer but should preserve the associated PDP context. The SGSN may initiate an RAB Assignment procedure in order to re-establish the radio access bearer.

However, when a direct tunnel has been established, this error handling does not function as the next contact point in user plane is the GGSN, not SGSN.

SUMMARY

In accordance with at least one, some or all of the embodiments of the invention, a solution to the following problem is provided.

When a Direct Tunnel (DT) has been established, the user data packets flow between the radio network and gateway node, e.g. GGSN, and the serving node, e.g. SGSN, has no knowledge of this. There is an error handling procedure defined in the GTP when the receiver (RNC, SGSN or GGSN) of the GTP-PDU does not find a corresponding context for the packet. In this case, the receiver will send an error indication (EI) message to the sender and the sender implicitly deactivates the related context or for RNC the radio access bearers, RABs. When this happens between the RNC and GGSN (in Direct Tunnel), the context is left hanging in the SGSN without information being sent to the SGSN, e.g. until some time-outs happen and the SGSN will become aware of the situation.

This problem that the packet data connection may be left hanging from SGSNs point of view (even if SGSN could try to re-establish the radio access bearer if it just was aware of the problem) can be solved by at least one or more of the embodiments of the invention.

In at least one or more of the embodiments of the invention, when a direct tunnel has been established and an error occurs or is detected such as a failure of a radio network controller, RNC, or a base station controller, BSC, the radio network or a controller thereof sends a failure message such as an error indication, EI, to GGSN instead of SGSN, in particular to that GGSN from which the RNC received the data packet to which the error is associated.

At least one of the embodiments of the invention provides a support node functionality, e.g. a GGSN and/or SGSN functionality for a case when a controller of the radio network such as RNC, is reset when using a Direct Tunnel.

In at least one of the embodiments of the invention, the gateway node such as GGSN stores one or more or all of the following: the IP-address and TEID-U of the serving node, e.g. SGSN, as well as the IP-address and TEID-U of the controller of the radio network, e.g. RNC or BSC, so as to be able to cope with a situation when the radio network controller sends an error indication message to the gateway node. When the gateway node receives such an error indication message e.g. for a context such as a PDP context related to the direct tunnel (DT context), it will send the subsequent packets to the serving node, e.g. SGSN, instead of the RNC.

Thus, in at least one or more of the embodiments of the invention, for Direct Tunnel packet data connections, the GGSN stores also SGSN's user plane parameters (address and TEID). Then in case an error indication is received from RNC for a data packet, a next user plane data packet received from the core network for the same packet data connection is routed from the GGSN to the serving node SGSN instead of radio access network, RNC. Thus, data loss can be significantly reduced and data transmission speed can be kept at high level. Also the gateway node or function, e.g. GGSN is aware that it should not release PDP context in case it is DT.

Further, the SGSN can carry out actions such as re-establishing the radio access bearer so as to quickly re-establish the direct tunnel between the GGSN and RNC.

Embodiments of the invention may optionally provide a solution which contributes to direct tunnel establishment or re-establishment after a Relocation procedure or an inter-system change e.g. from a second generation (2G) network to a third generation (3G) network, or a change from a non-Iu-interface to a Iu-interface has occurred, or more generally basically after any procedure where the IP-address/TEID of the SGSN changes with a DT context. After relocation (or other procedure as mentioned above) when the PDP context is updated towards the GGSN it is not possible with current GTP messages to inform the GGSN of the SGSN's and the RNC's IP-address and TEID-U in the same message.

In accordance with one or more or embodiments of the invention which optionally may be used together with one or more of the above or below described features of other embodiments, a message such as an update message sent from a serving node to a tunnel endpoint such as the gateway node may include at least one or more of the following information elements or fields; an indication that the context is a direct tunnel context, an IP address such as an IP-U address of the serving node, e.g. SGSN, a TEID-U of the serving node, an IP address such as an IP-U address of the radio network e.g. of the RNC, and a TEID-U of the radio network e.g. of the RNC.

One or more or all of these information elements or fields may be added to a message which may be sent from the serving node to the gateway node e.g. in case of errors or changes of the address or identifier of the serving node SGSN. Thus, a single message may be sufficient for informing the tunnel endpoint such as the gateway node GGSN on the relevant addresses or identifiers so as to enable the tunnel endpoint to directly contact the serving node if necessary. In an embodiment, the information elements or fields may be added to an update message such as a GTP Update PDP Context Request message. One such message is sufficient for informing a, or both, tunnel end points on the relevant data.

This embodiment or embodiments are able to improve the error handling when the IP-address and/or TEID, e.g. IP-U, TEID-U, of the serving node, e.g. SGSN, e.g. of the user plane change.

Further, the addition of the additional information elements or fields decreases the signalling load and time delay which would otherwise be caused when using two message pairs. Without such additional fields, the serving node may have to send, after the SGSN's IP-address and/or TEID-U have changed, two GTP messages towards the GGSN for informing it on the changed address and identifier, leading to high signaling load. In a case where a high speed packet access technique such as Internet High Speed Packet Access, I-HSPA, is employed which uses direct tunnel, DT, relocations may happen quite often. The reduction of the number of messages per relocation or other procedure from two to one thus leads to significant benefits. The invention is of course not limited to such a transmission technique and other transmission techniques may also be employed which and can advantageously use the above feature.

In at least one or more of the embodiments, additional elements such as e.g. TEID-U and IP-U for both RNC and SGSN are included into an update message such as a update request or response message. As an example, these additional elements are included into an Update PDP Context message which is sent to establish Direct Tunnel. Such additional elements like TEID-U and IP-U for both RNC and SGSN may in at least one another or further implementation be included not only into an update message when e.g. a change of IP address has taken place but also into some or all other procedures or messages which may e.g. be sent from the serving node like SGSN to a direct tunnel endpoint like GGSN or vice versa. Every procedure or message may thus include all the additional elements (e.g. TEID-U and IP-U for both RNC and SGSN). Such an implementation is more generic and easy to implement.

Further, the serving node, e.g. SGSN, may optionally keep the TEID that it allocated to GGSN for downlink traffic. Thus, the serving node maintains or stores the information on the TEID of the GGSN for downlink traffic, and may use it e.g. for sending information to the GGSN.

These and various other advantages and features of the invention are described below with reference to the attached drawings which illustrate aspects of embodiments of the invention.

DESCRIPTION OF EMBODIMENTS OF THE INVENTION

Figure 1:
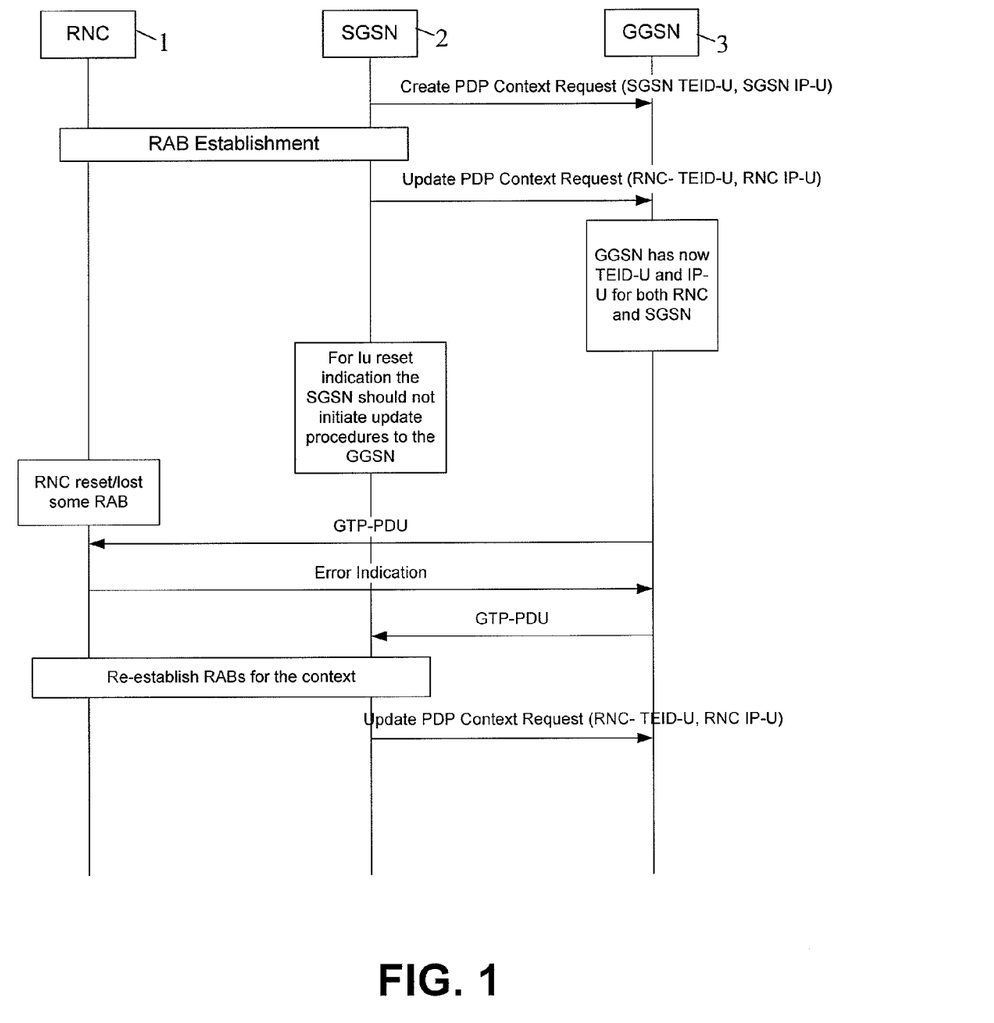
FIG. 1 shows an embodiment of the invention.

FIG. 1 shows an embodiment of a method, structure and device in accordance with the invention. In a first step, an SGSN 2 sends a message such as a create PDP context request to a GGSN 3, indicating in the request its tunnel endpoint identifier for the user plane, SGSN TEID-U, and its IP address for the user plane, IP-U. The GGSN 3 stores the tunnel endpoint identifiers (TEID-U and IP address) received from the SGSN 2.

Then, a radio access bearer establishment is carried out between the SGSN 2 and a radio network controller, RNC, 1. The SGSN 2 may decide to establish a Direct Tunnel between the GGSN 3 and the RNC 1. In this case, the SGSN 2 informs the GGSN 3 by sending a message such as an update PDP context request to a GGSN 3, including Direct Tunnel Indication (DTI) and indicating in the request the tunnel endpoint identifier for the user plane of the RNC 1, RNC TEID-U, and the IP address for the user plane of the RNC 1, RNC IP-U. From the DTI the GGSN 3 thus knows that Direct Tunnel is used and therefore it must store the TEID-U and the address, IP-U, of both RNC 1 and SGSN 2 in a storage 5 shown in FIGS. 6, 7, instead if storing only the updated tunnel endpoint identifier received in the latter message (update PDP context request) received from the SGSN 2. The GGSN 3 and RNC 1 can now send user traffic packets, packet data units PDUs, via a direct tunnel between RNC 1 and GGSN 3.

In case of a Iu reset indication, the SGSN 2 will not initiate update procedures to the GGSN 3.

Figure 5:
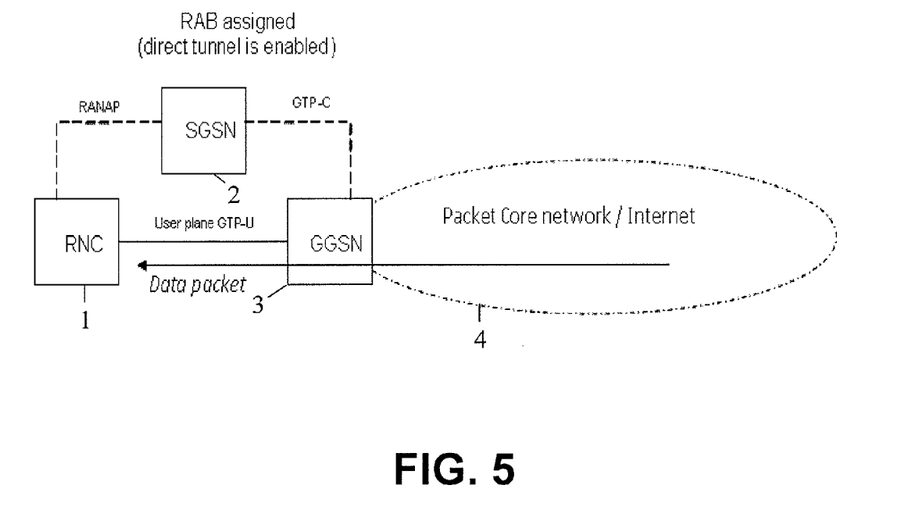
FIG. 5 shows a case where a direct tunnel is established and user packets flow is directly sent between RNC and GGSN.
Figure 6:
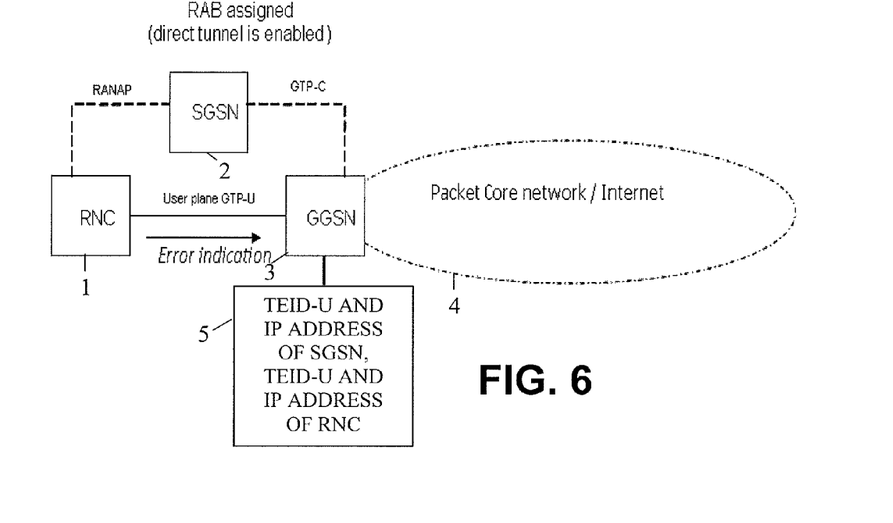
FIG. 6 illustrates a case where a direct tunnel has been established and an error indication is sent from RNC to GGSN.
Figure 7:
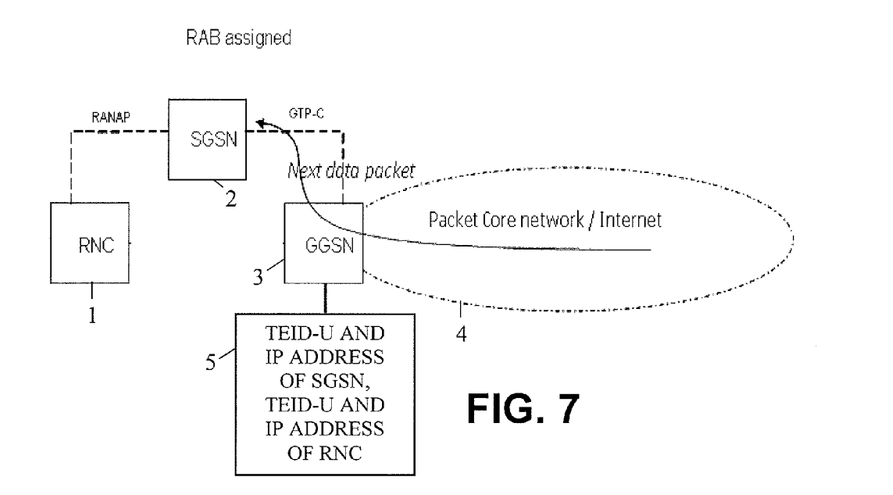
FIG. 7 shows a case where subsequent user data packets are sent from GGSN to SGSN in accordance with at least one embodiment of the invention.

The user traffic PDUs are sent from and to a packet network 4 such as Internet, as shown in FIGS. 5 to 7.

When the RNC 1 should be reset or lose the RAB for some reason, a subsequent GTP PDU sent from the GGSN 3 to the RNC 1 will probably not be correctly received. The RNC 1 therefore sends an Error Indication, EI, to the GGSN 3. The GGSN 3 receives the Error indication (EI) and detects, preferably based on DTI received from SGSN 2 during the connection setup, that the packet data connection in question has been marked as Direct Tunnel (DT) context. The GGSN 3 shall mark that EI has been received for the connection and when a following data packet is received from the packet network 4 for the same connection the GGSN 3 sends it to the SGSN 2 instead of the RNC 1. Since during connection setup GGSN 3 received DTI from the SGSN 2 the GGSN 3 has stored the SGSN TEID-U and IP-U of SGSN 2 as explained before, and is thereby able to send the incorrectly received and or the next packet data units GTP-PDUs directly to the SGSN 2 instead of RNC 1. The SGSN 2 is thus immediately informed on the break down of the direct tunnel between GGSN 3 and RNC 1 and can start necessary recovery actions, for example, to re-establish one or more RABs for the context for the direct tunnel. The SGSN 2 may forward the PDU received from the GGSN 3 to the RNC 1 via the re-established radio access bearer(s). Further, the SGSN 2 sends a message such as an update PDP context request to the GGSN 3, indicating in the request, the DTI, the new tunnel endpoint identifier for the user plane of the RNC 1, RNC TEID-U, and the new IP address for the user plane of the RNC 1, RNC IP-U. The GGSN 3 can thus send and receive the next PDUs via the re-established direct tunnel between RNC 1 and GGSN 3.

The solution provided by this or other embodiments is applicable to the Direct Tunnel (also known as One Tunnel) functionality, which is usable not only in GPRS but also in other technologies such as Internet High Speed Packet Access, I-HSPA, as well. Embodiments of the invention provide for error handling e.g. in case of RNC reset.

To speed up this procedure for RNC reset (or for other reasons when e.g. the RNC has lost the RAB), at least one or more of the embodiments of the invention include one or more of the following features.

The GGSN 3 stores for a context used for the direct tunnel indicating the TEIDs and IP addresses, also called direct tunnel, DT, context, the SGSN TEID for the user plane and IP-address for the user plane. When the GGSN receives an error indication and it has marked the context as direct tunnel context it detects or stores that an error indication was received. When a following packet comes for the RNC, the GGSN sends it to the SGSN and not to the RNC. When SGSN receives the packet for DT context it re-establishes the RABs (possibly also pages the user equipment, UE) for the context. When the RABs have been re-established the SGSN informs the GGSN on the RNC's TEID-U and IP-U, e.g. by sending an information message such as DTI, to GGSN. The GGSN then preferably sends the following packets directly to the RNC.

In case the SGSN has lost the context for the PDU that the GGSN sent it shall indicate that to the GGSN with an error indication such as "Error Indication".

In case the context for some reason has been lost from the UE the SGSN deletes the context from the GGSN.

As shown in the embodiment of FIGS. 6, 7, the GGSN 3 comprises, or has access to a storage 5 which stores the Direct tunnel Indication (DTI), the TEID-U and IP ADDRESS of the SGSN 2 and the TEID-U and IP ADDRESS of the RNC 1 in a context for the direct tunnel. The GGSN 3 stores the SGSN's IP-address and TEID-U as well as the RNC's IP-address and TEID-U for handling the PDU transmittal in particular in a situation when the RNC sends the error indication message to the GGSN 3. When the GGSN 3 receives the error indication for DT context, as shown in FIG. 1 or 6, it accesses the storage 5 for reading the IP-address and TEID-U of the SGSN 2. The GGSN 3 will send the following packets to the SGSN 2 using the IP-address and TEID-U of the SGSN 2 instead of the RNC 1, as shown in FIG. 7.

Thus, a GGSN and SGSN functionality are provided for a case when the RNC is reset when a Direct Tunnel is used.

The SGSN's address and TEID are stored in GGSN 3 (storage 5) only in case of direct tunneling. So, determining/detecting direct tunneling situation in GGSN 3 is a feature of embodiments of the invention, and is a precondition for storing SGSN's user plane details.

Normally, GGSN 3 may not know whether the address and TEID given by SGSN 2 are for RNC 1 or for another SGSN. Based on given address and TEID, GGSN 3 may not know whether it is sending to RNC or SGSN. Based on direct tunnel indication GGSN 3 may determine that it is sending to RNC 1 and should change to SGSN 2 in case an error indication is received from RNC 1.

In another alternative embodiment of the invention, the GGSN 3 sends PDP context update to the SGSN 2 which can also trigger SGSN 2 to re-establish RAB. This way the SGSN 2 functionality changes can be minimized. Also the PDP context update can be sent, in accordance with one, more or all of the embodiments of the invention, to SGSN GTP-C address.

In the embodiment of FIG. 1, for Iu-reset SGSN 2 does not necessarily initiate PDP update to GGSN 3, but optionally should or may try to re-establish RAB to minimize the delay (at least if it is RT context, real-time context, or another type of context), and the PDP update may be needed if QoS etc changes.

In the embodiment such as shown in FIG. 3, GTP-U may also be located in the user equipment, UE, in accordance with an alternative embodiment of the invention. This option may be in compliance with U-Generic Access Network (U-GAN) (UMTS-Unlicensed Mobile Access (UMA)) standardization.

In the embodiment of FIG. 4, a PDP context preservation is provided. In an alternative embodiment of the invention, a normal RAB release (e.g. inactivity) may be provided without any preservation, since preservation may preferably be done for RT contexts only. Preservation is just to set MBR or GBR to zero from SGSN to GGSN.

A direct tunnel, DT, context may, in accordance with one, more or all of the embodiments of the invention, correspond to a normal PDP context stored in the GGSN 3 but has at least one the following additional fields or flags: "Direct Tunnel, DT" which is set to yes in case a direct tunnel has been established between the RNC 1 and the GGSN 3; TEID-U of RNC 1; and IP-U address for the user plane of the RNC 1.

Figure 8:
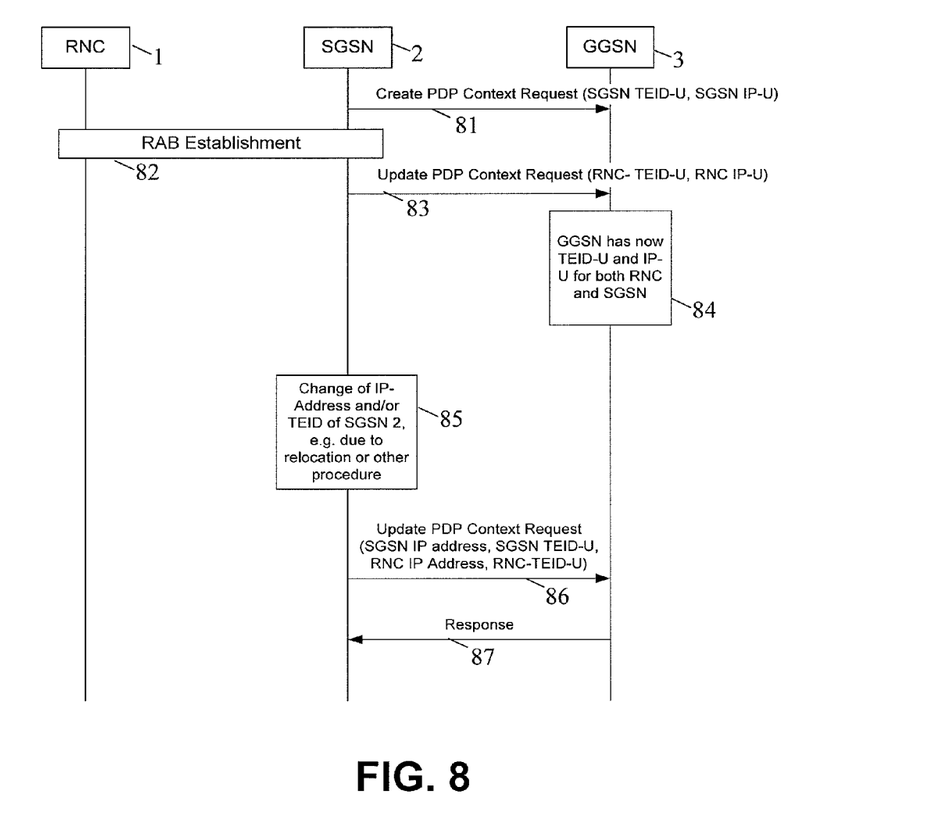
FIG. 8 shows a further embodiment of the invention.

FIG. 8 illustrates an embodiment allowing establishing a direct tunnel between a first tunnel endpoint such as RNC 1 and a second tunnel endpoint such as GGSN 3. The elements 1 to 3 as well as the steps and messages 81 to 84 may be identical to the elements and steps shown in FIG. 1, as described above. The other features and functions of the embodiment of FIG. 1 may optionally also be provided in the embodiment of FIG. 8. When the direct tunnel between the first tunnel endpoint 1 and the second tunnel endpoint 3 has been established, a change of the IP-Address and/or TEID of the user plane of the SGSN 2 may occur as shown in block 85, e.g. due to a relocation procedure or an inter-system change e.g. from a second generation (2G) network to a third generation (3G) network, or due to a change from a non-Iu-interface to a Iu-interface, or more generally due to any procedure where the IP-address/TEID of the SGSN 2 (e.g. user plane) changes.

Subsequent to such a change 85, the SGSN 2 sends a message 86 such as an update PDP context request message to the GGSN 3 for informing the GGSN 3 on the changed address and/or identifier. The GGSN 3 is thus able to directly send a message or a, some or all further packet data units PDU to the SGSN 2, e.g. after receipt of an error indication from the RNC 1 as shown in FIG. 1, so as to optionally implement, without being limited thereto, the functionality of the embodiments described above with reference to FIGS. 1 to 7. The GGSN 3 may respond by returning a message 87, e.g. an update PDP context response, confirming receipt of the message 86.

Figure 9:
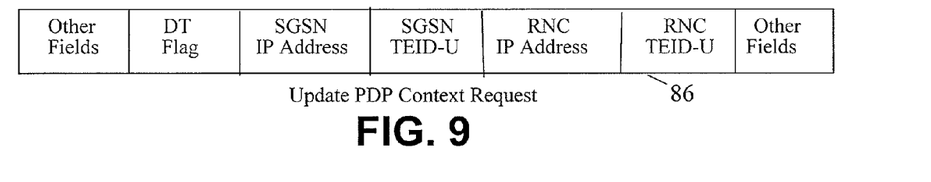
FIG. 9 illustrates an example structure of an update message which may be used in the embodiments described below and above.

As shown in FIG. 8 and in more detail in FIG. 9, the message 86 may include at least one or more or all of the following information elements or fields:

a DT field or flag or information element indicating that the PDP Context is a direct tunnel context for establishing a direct tunnel, an IP address such as IP-U of SGSN 2, a TEID-U of SGSN 2, an IP address such as IP-U of the RNC 1, and a TEID-U of RNC 1. Other fields may be provided as needed which other fields may be located before or after the above mentioned fields or at any other appropriate location of the message 86.

Figure 10:
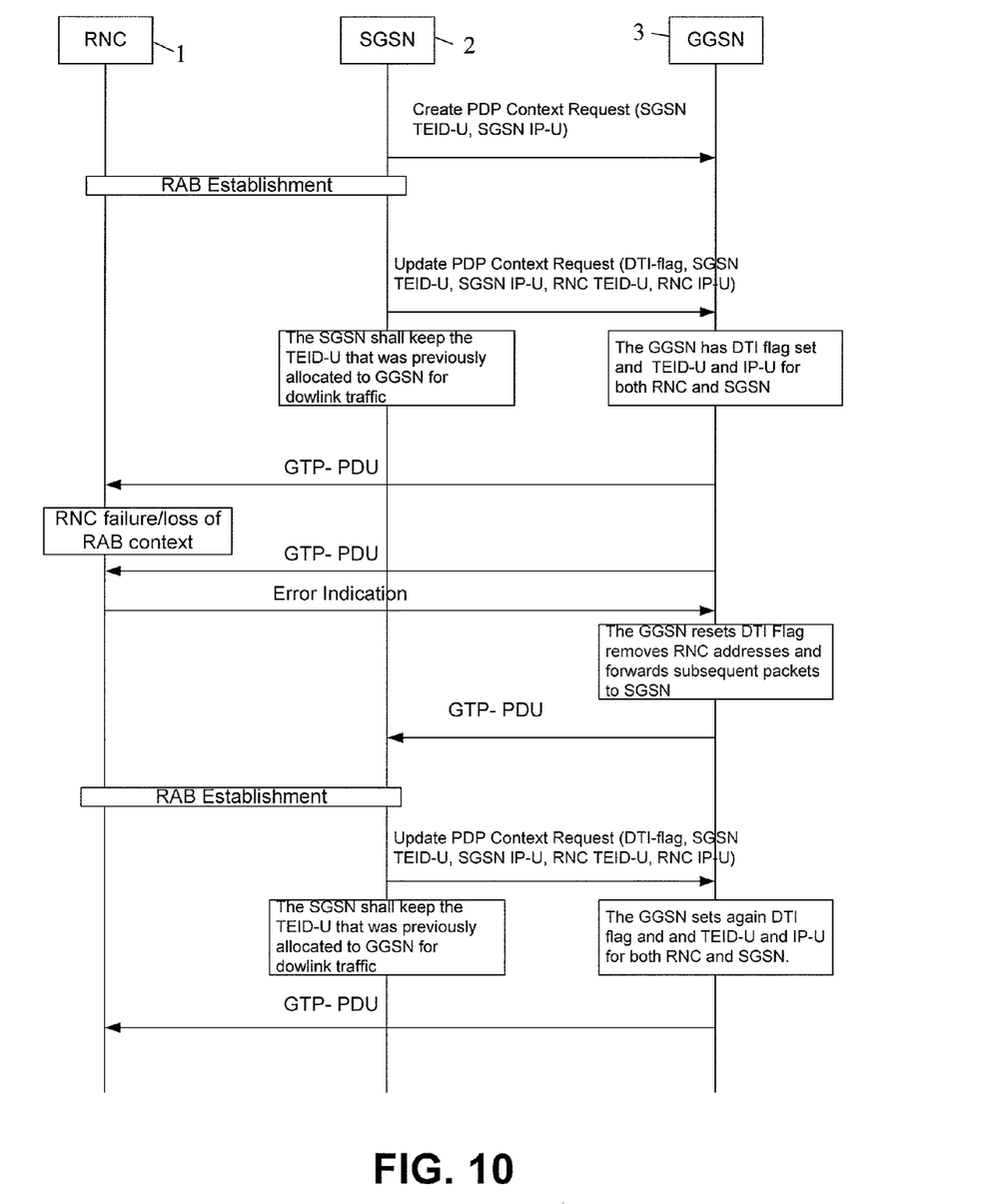
FIG. 10 shows a further embodiment of the invention.

FIG. 10 shows another embodiment which may combine at least part or all of the features of the embodiments shown in, and described above with reference to, FIGS. 1 and 8.

In the embodiment of FIG. 10, SGSN 2 sends a Create PDP Context Request (SGSN TEID-U, SGSN IP-U) to the GGSN 3 for creating a PDP context. After establishment of one or more radio access bearers, the SGSN 2 sends an Update PDP Context Request to the GGSN 3, indicating information elements DTI-flag indicating that a direct tunnel is to be established, SGSN TEID-U, SGSN IP-U, RNC TEID-U, and RNC IP-U. The GGSN 3 sets the DTI flag in the PDP context which is thus a direct tunnel context, and TEID-U and IP-U for both RNC 1 and SGSN 2.

The SGSN 2 shall keep the TEID-U that was previously allocated to GGSN 3 for downlink traffic.

The GGSN 3 will send packets GTP-PDUs to the RNC 1 directly via the direct tunnel.

When RNC failure/loss of RAB context occurs, a subsequently sent packet sent via the direct tunnel will not be correctly received by the RNC 1, which then returns an error indication to the GGSN 3.

The GGSN 3 resets the DTI Flag so as to indicate that the direct tunnel to RNC will no longer be used, removes RNC addresses and forwards subsequent packets to SGSN 2.

When a RAB Establishment is again carried out between RNC 1 and SGSN 2, the above described step of sending an Update PDP Context Request from the SGSN 2 to the GGSN 3, including information elements DTI-flag indicating that a direct tunnel is to be established, SGSN TEID-U, SGSN IP-U, RNC TEID-U, RNC IP-U, is repeated. The GGSN 3 sets again the DTI flag in the PDP context which is thus a direct tunnel context, and TEID-U and IP-U for both RNC 1 and SGSN 2.

The SGSN 2 again keeps the TEID-U that was previously allocated to GGSN 3 for downlink traffic.

The GGSN 3 will send future packets GTP-PDUs to the RNC 1 directly via the re-established direct tunnel.

At least one or more of the embodiments of the invention comprises one or more or all the following features in any arbitrary combination:

a packet data gateway node stores a direct tunnel, DT, context;

the direct tunnel, DT, context and/or an information or update message such as an update PDP context request has at least one the following additional fields or flags: "Direct Tunnel, DT" which is set to yes in case a direct tunnel has been, or is to be, established between the RNC 1 and the packet data gateway (GGSN 3);

TEID-U of SGSN 2; and IP-U address of the user plane of the SGSN 2;

TEID-U of RNC 1; and IP-U address of the user plane of the RNC 1;

the packet data gateway node is a Gateway GPRS support node (GGSN);

the packet data gateway node checks, when receiving an error indication from the RNC, whether a direct tunnel is established between the packet data gateway node and the RNC; when a direct tunnel exists, the packet data gateway node reads at least one of the TEID-U of SGSN 2; and IP-U address of the user plane of the SGSN 2;

the packet data gateway node sends user traffic or packets, after receipt of the error indication, to the SGSN 2, the SGSN re-establishes one or more RABs in the RNC 1 and informs the packet data gateway node on the new TEID-U and IP-U address of RNC 1;

the packet data gateway node uses the direct tunnel to RNC based on the new TEID-U and IP-U address of RNC 1;

an update message is generated or sent by a serving node such as an SGSN after a relocation procedure or an inter-system change e.g. from a second generation (2G) network to a third generation (3G) network, or a change from a non-Iu-interface to a Iu-interface has occurred, or more generally basically after any procedure where the IP-address/TEID of the serving node changes with a DT context;

the update message includes TEID-U and IP-U of the serving node and/or TEID-U and IP-U address of a radio network controller;

one or more or all of these information elements or fields may be added to a message sent from the serving node to the gateway node e.g. in case of errors or changes of the address or identifier of the serving node SGSN so that a single message may be sufficient for informing the tunnel endpoint such as the gateway node GGSN on the relevant addresses or identifiers;

the information elements or fields may be added to an update message such as a GTP Update PDP Context Request message;

the addition of the additional information elements or fields decreases the signalling load and time delay which would otherwise be caused when using two message pairs;

a high speed packet access technique such as Internet High Speed Packet Access, I-HSPA, may be employed which uses direct tunnel, DT.

According to another aspect of the invention, at least one or more of the embodiments of the invention comprises at least one or more of the following features of a packet data gateway configured to;

receive first user plane end point details for a packet data context to be established, receive second (updated) user plane end point details for the packet data context to be established associated with a direct tunnel indication indicating that said packet data context is a direct tunnel packet data context, store, based on said direct tunnel indication, said first and second (updated) user plane end point details, use said second (updated) user plane end point details for routing packet data flow for said packet data context, receive an error indication for said packet data context, determining, when receiving said error indication, if said packet data context is a direct tunnel packet data context, use said first user plane end point details for initiating recovery process if it is determined that said packet data context is a direct tunnel packet data context;

wherein said first user plane end point details are received in a create packet data context request;

wherein said second (updated) user plane end point details are received in an update packet data context request;

wherein said recovery process comprises routing a (next) received data packet for said direct tunnel packet data context to a serving node from which the first user plane end point details were received;

wherein said recovery process comprises routing said error indication to a serving node from which the first user plane end point details were received;

additional elements such as e.g. TEID-U and IP-U for both RNC and SGSN are included into an update message such as a update request or response message to establish Direct Tunnel;

such additional elements like TEID-U and IP-U for both RNC and SGSN may be included not only into an update message but also into some or all other procedures or messages which may e.g. be sent from the serving node like SGSN to a direct tunnel endpoint like GGSN or vice versa;

some or every procedure or message may include all the additional elements (e.g. TEID-U and IP-U for both RNC and SGSN;

the serving node, e.g. SGSN, may optionally keep the TEID that was previously allocated to GGSN for downlink traffic;

the serving node maintains or stores the information on the TEID of the GGSN for downlink traffic, and may use it e.g. for sending information to the GGSN.

The invention also comprises at least one of a system, method, chip and software product for carrying out at least one or more or all of the above mentioned features in any arbitrary combination. The software or computer program product thus comprises code means for carrying out the features of the method, when run on a computer.

The invention claimed is:

1. An apparatus comprising:
a processor configured to store a direct tunnel context,
the direct tunnel context comprising a field or flag indicating whether or not a direct tunnel is established between the apparatus and a radio network, the direct tunnel context further comprising at least one of a tunnel endpoint identifier and an address of a user plane of a serving node; wherein the processor is further configured to check, when receiving an error indication from the radio network, whether a direct tunnel is established between the apparatus and the radio network, and if it is determined that the direct tunnel is established between the apparatus and the radio network to inform the serving node that the error indication has been received from the radio network and to send, after receipt of the error indication, user traffic or packets to the serving node using at least one of the tunnel endpoint identifier and the address of the user plane of the serving node.

2. The apparatus of claim 1, wherein the direct tunnel context further comprises at least one of a tunnel endpoint identifier and an address of a user plane of a controller of the radio network.

3. The apparatus claim 1, wherein the apparatus is a gateway or a gateway general packet radio service support node.

4. The apparatus of claim 1, wherein the processor is further configured to receive an update message from the serving node after a change procedure of changing an address or tunnel endpoint identifier of the serving node, the update message including at least one of a tunnel endpoint identifier or Internet protocol address of a user plane of the serving node and a tunnel endpoint identifier or Internet protocol address of a user plane of a controller of the radio network.

5. The apparatus of claim 1, wherein the processor is further configured to send a packet data protocol context update message to the serving node, for triggering the serving node to re-establish a radio access bearer.

6. The apparatus of claim 1, wherein the processor is further configured to reset the field or flag so as to indicate that the direct tunnel to the radio network will no longer be used, to remove a radio network controller address and to forward subsequent packets to the serving node.

7. An apparatus comprising:
a processor configured to store a direct tunnel context, the direct tunnel context comprising a field or flag indicating whether or not a direct tunnel is established between the apparatus and a radio network, the direct tunnel context further comprising at least one of a tunnel endpoint identifier and an address of a user plane of a serving node; wherein the processor is further configured to determine, when receiving an error indication for a packet data context, whether said packet data context is a direct tunnel packet data context,
and to use user plane end point information relating to the serving node for initiating a recovery process if it is determined that said packet data context is a direct tunnel packet data context,
where said recovery process comprises informing the serving node of the receipt of the error indication for the direct packet data context and routing a received data packet for said direct tunnel packet data context from the apparatus to the serving node.

8. The apparatus of claim 7, wherein the recovery process includes re-establishing one or more radio access bearers in the radio network.

9. The apparatus of claim 7, wherein the recovery process includes informing the apparatus on a new tunnel endpoint identifier and address of a user plane of a controller of the radio network.

10. The apparatus of claim 9, wherein the processor is further configured to establish a direct tunnel to the controller based on the new tunnel endpoint identifier and address of the user plane of the controller of the radio network.

11. A method comprising:
storing a direct tunnel context, the direct tunnel context comprising a field or flag indicating whether or not a direct tunnel is established between an apparatus and a radio network, and at least one of a tunnel endpoint identifier and an address of a user plane of a serving node; and
in response to receiving an error indication from the radio network, checking whether a direct tunnel is established between the apparatus and the radio network, and if the direct tunnel is established informing the serving node that the error indication has been received from the radio network and sending user traffic or packets to the serving node using at least one of the tunnel endpoint identifier and the address of the user plane of the serving node.

12. The method of claim 11, wherein the direct tunnel context further comprises at least one of a tunnel endpoint identifier and an address of a user plane of a controller of the radio network.

13. A method comprising:
receiving first user plane end point information for a packet data context to be established, the first user plane end point information indicating a serving node,
receiving second user plane end point information for a packet data context, the packet data context including a direct tunnel indication indicating that said packet data context is a direct tunnel packet data context,
storing said first and second user plane end point information,
using said second user plane end point information for routing packet data flow for said packet data context,
determining, when receiving an error indication for said packet data context from a radio network, whether said packet data context is a direct tunnel packet data context,
and to use said first user plane end point information for initiating a recovery process with the serving node if it is determined that said packet data context is a direct tunnel packet data context,
where said recovery process comprises informing the serving node of the receipt of the error indication for the direct packet data context and routing a received data packet for said direct tunnel packet data context to the serving node.

14. Method according to claim 13, further comprising at least one of:
said first user plane end point information is received in a create packet data context request;
said second user plane end point information is received in an update packet data context request.

15. Method according to claim 13, further comprising at least one of:
the serving node keeps a tunnel endpoint identifier previously allocated to a gateway for downlink traffic;
the serving node maintains or stores the information on the tunnel endpoint identifier allocated to the gateway for downlink traffic;
the serving node uses the information on the tunnel endpoint identifier allocated to the gateway for downlink traffic for sending information to the gateway.

16. A computer program product comprising at least one non-transitory computer-readable storage medium having computer-executable program code portions stored therein, the computer-executable program code portions comprising:
program code instructions for storing a direct tunnel context, the direct tunnel context comprising a field or flag indicating whether or not a direct tunnel is established between the apparatus and a radio network, the direct tunnel context further comprising at least one of a tunnel endpoint identifier and an address of a user plane of a serving node; and
wherein the computer-executable program code portions further comprising program code instructions for checking, when receiving an error indication from the radio network, whether a direct tunnel is established between the apparatus and the radio network, and if it is determined that the direct tunnel is established between the apparatus and the radio network informing the serving node that the error indication has been received from the radio network and sending user traffic or packets to the serving node using at least one of the tunnel endpoint identifier and the address of the user plane of the serving node.

* * * * *